April 28, 1964 A. K. CHITAYAT 3,131,303
NEGATIVE TO POSITIVE FILM VIEWER
Filed Jan. 22, 1962 4 Sheets-Sheet 1

*INVENTOR.*
ANWAR K. CHITAYAT
BY James P. Malone

April 28, 1964     A. K. CHITAYAT     3,131,303
NEGATIVE TO POSITIVE FILM VIEWER
Filed Jan. 22, 1962     4 Sheets-Sheet 2
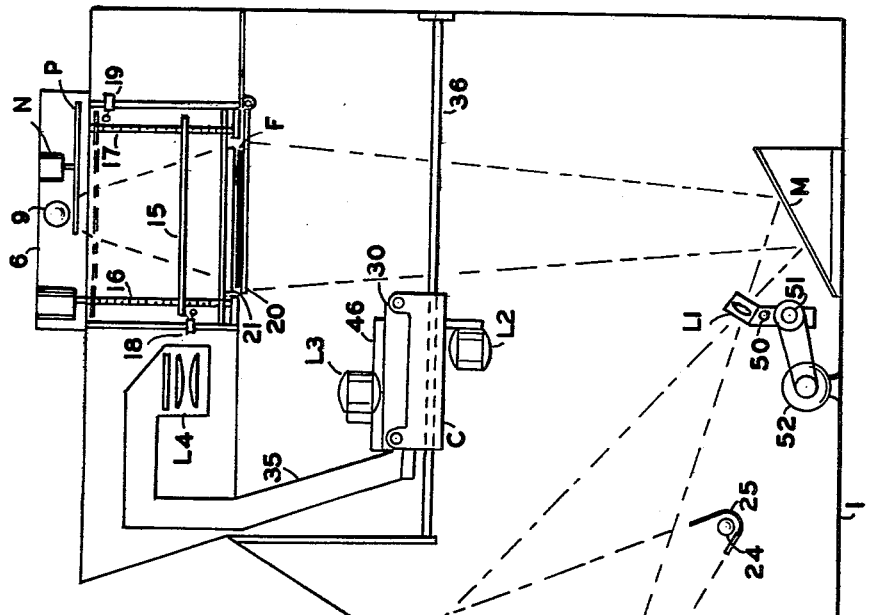
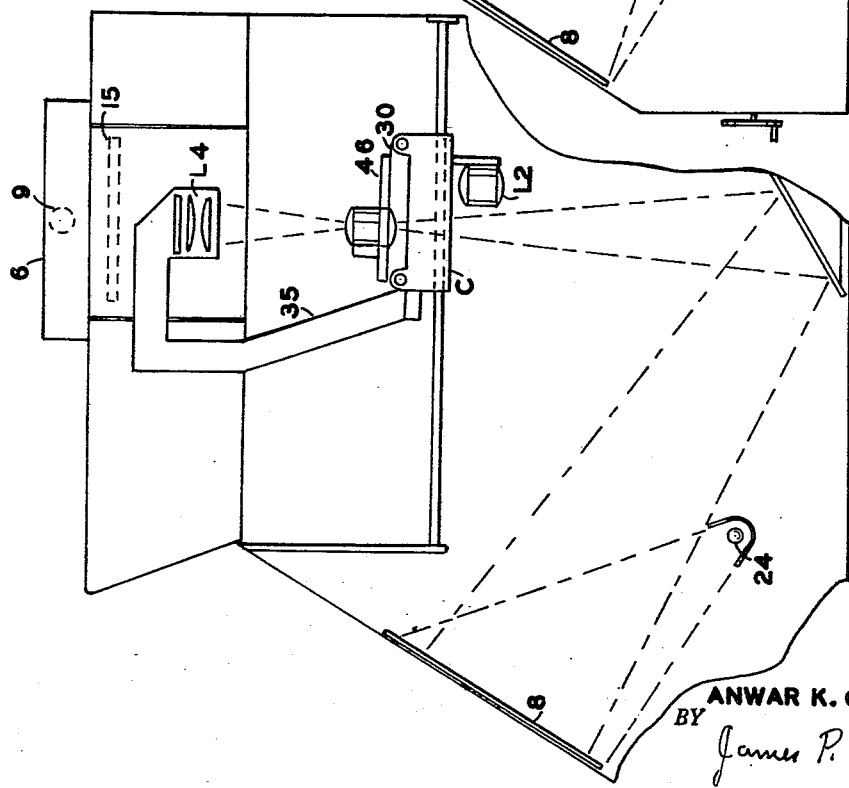
INVENTOR.
ANWAR K. CHITAYAT
BY James P. Malone April 28, 1964 A. K. CHITAYAT 3,131,303
NEGATIVE TO POSITIVE FILM VIEWER
Filed Jan. 22, 1962 4 Sheets-Sheet 4
FIG 5
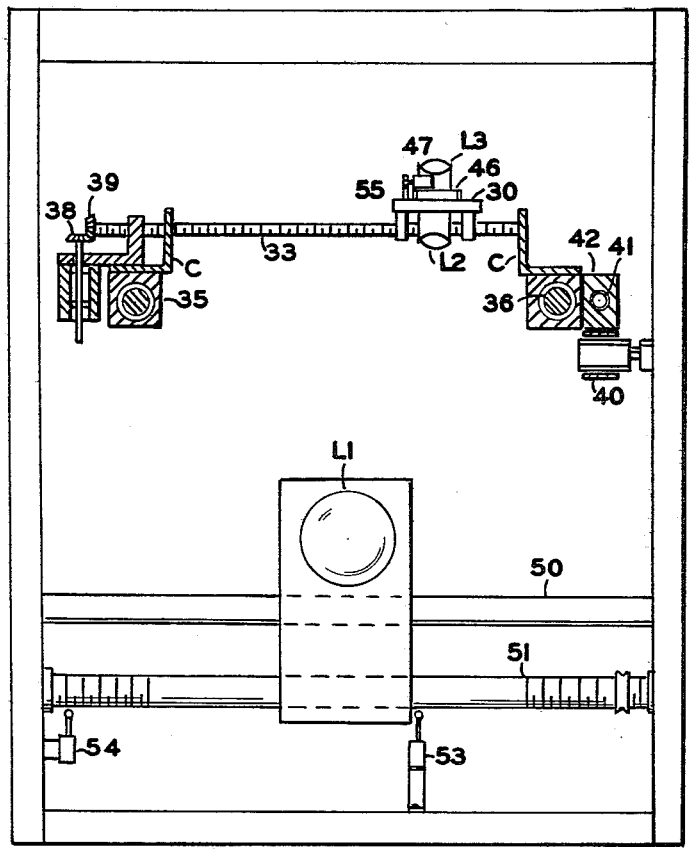
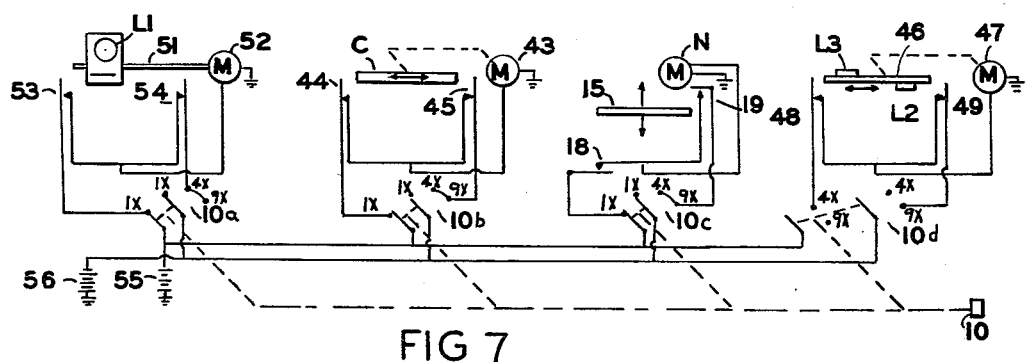
FIG 7
INVENTOR.
ANWAR K. CHITAYAT
BY James P. Malone

# United States Patent Office 3,131,303
Patented Apr. 28, 1964

3,131,303
NEGATIVE TO POSITIVE FILM VIEWER
Anwar K. Chitayat, Plainview, N.Y., assignor to
Optomechanisms, Inc., Mineola, N.Y.
Filed Jan. 22, 1962, Ser. No. 167,778
2 Claims. (Cl. 250—71)

This invention relates to a film viewer and more particularly to means for obtaining a positive image directly from a film negative.

In the photo interpretation and editing of film it is sometimes desirable, especially when looking for detail, to evaluate the film as a positive and not as a negative. The printing of positives merely for editing or when searching for a specfic piece of information is a very costly process, especially if a large percentage of the film is going to be discarded or be otherwise useless for the desired purpose. In addition, some details of the film may be lost due to the reproduction process.

The present invention solves this difficulty by providing a viewer which projects a positive image directly from the negative film. The invention generally comprises a source of ultra-violet radiation, a source of infrared radiation, a film holder and a viewing screen having a coating made luminous by the ultra-violet but quenched by the infra-red transmitted through the film. Means are provided for various degrees of magnification and for scanning film for the purpose of magnifying a desired portion. A plurality of lenses of different magnifications are mounted on a mount which is movable by remote control to magnify predetermined small portions of the film. Means are provided for pulsing the infra-red radiation in order to increase the brightness of the screen without over-heating the film. It has been found that the phosphor screen will store the energy between pulses so that the effective energy average may be of the order of four times the average of the transmitted pulses.

Accordingly a principal object of the invention is to provide new and improved film viewing means.

Another object of the invention is to provide new and improved means for obtaining a positive image directly from a negative film.

Another object of the invention is to provide new and improved means for obtaining a positive image directly from a negative film comprising sources of ultraviolet radiation, a translucent luminescent screen responsive to the radiation, and a source of infra-red radiation transmitted through the film to quench the luminescence to thereby reverse the image from negative to positive.

Another object of the invention is to provide new and improved means for obtaining a positive image directly from a negative film including means to scan the film and means to magnify a portion of the film with a selected one of a plurality of magnifications.

These and other objects of the invention will be apparent from the following specification and drawings of which:

FIG. 2 is a schematic side view of an embodiment of the invention in position for 1:1 magnification.

FIG. 3 is a schematic side view of the embodiment of FIG. 1 illustrating the parts in position for increased magnification.

FIG. 5 is a vertical sectional view taken along lines 5—5 of FIG. 4.

FIG. 7 is a schematic circuit diagram.

GENERAL DESCRIPTION

The system generally comprises an optical viewing system for the projection of negative film which may include 70 mm., 5 inch, and 9 inch photographic black and white film onto a special luminescent phosphor screen which will produce a positive image for use in photo interpretation. The phosphor may be zinc sulphide activated by copper or iron.

Figure 1:
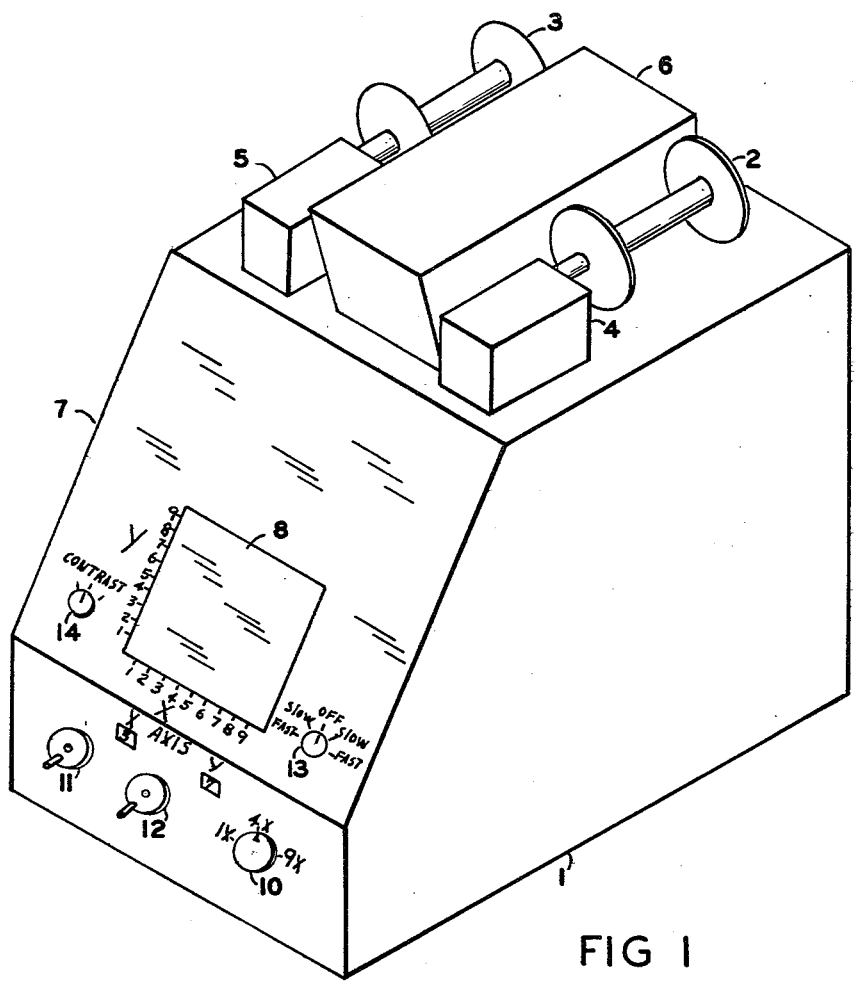
FIG. 1 is a perspective view of the embodiment of the invention.

The viewer is housed in a cabinet 1 as shown in FIG. 1. The film drive 2, 3, 4, 5 and projection system 6 are mounted above the console with the controls 10–14 for operation located on a front panel. The viewing screen 8 is on an inclined plane 7 for operator comfort.

General Optical Design

The optical system consists of three lenses for 1×, 4× and 9× magnification of the image. The actuating knob 10 in FIG. 1 places the proper lenses in the optical path, as will be explained.

The optical schematic is shown in FIG. 2. The infrared source preferably consists of two 500 watt projection lamps 9 for infra-red quenching of the luminescent phosphor. A reflector system directs the light through the infra-red filter 22 and then through glass pressure plates and film F. The design of the lamp reflectors is such that uniform illumination is obtained on different portions of the film.

The optical system allows viewing of either 70 mm., 5″ or 9″ film. Adjustable guides on the glass film plates are preferably used for centering the film as it is fed into the viewing systems. The film flattening is accomplished by passing the film between two glass plates 20, 21. These plates preferably mechanically separate during film transport in order to prevent film scratch.

An important feature of the system is the inclusion of different magnifications. Thus, the operator may view the film at 1×; after which he may then be interested in a certain portion of the film to be enlarged. He therefore notes the coordinates on the scale, and sets knobs 11 and 12 accordingly. Then, when he turns the control 10 to 4× or 9×, the section of interest is automatically placed on the screen in enlarged proportion. As he views the magnified film, further adjustments may be made.

1× Magnification System (FIG. 2)

Viewing of the film at a 1:1 magnification is accomplished by lens 15, mounted on lead screws 16 and 17 which collects the transmitted infra-red light passing through the negative F. This light then is reflected by mirror M and then focused onto the viewing screen by lens L1. Carriage C and lenses L2, L3 and L4 are automatically retracted.

4× and 9× Magnification System (FIG. 3)

The requirement to scan and view a small section of the film is achieved as follows:

The 4× and 9× lens assemblies are mounted on an X and Y axis carriage system. If a particular section of film is to be viewed through the 4× or 9× system the lenses are maneuvered to this area by the X and Y controls on the console panel, which automatically indicate the position of the 4× and 9× lenses within the X and Y carriages.

General operation of the system is to place the knob 10 in the 1× position, view the complete film frame, and note a particular point of interest. Then move the X and Y controls to the desired coordinates. Then the magnification change knob 10 is moved to the 4× or 9× position for corresponding magnification. Lenses L1 and 15 are automatically retracted when in 4× or 9× position.

The Carriage System

The 4× and 9× magnification lenses are mounted on a carriage which is controlled for selecting either of the lenses. Two additional flexible cables are used for positioning the carriage in the X and Y axes.

The Ultraviolet Light Source

The ultraviolet illumination for the phosphor screen is developed by one or more black light fluorescent lamps 24. The fluorescent lamps used have self-contained filters for transmission of the 350 millimicron ultraviolet. This eliminates background degradation of the viewed image due to the visible light emitting from the fluorescent lamps. These are arranged along the edges of the phosphor screen. These lamps are turned on when the main power switch is actuated. The infra-red transmitted through the film quenches portions of the luminous screen and thereby reverses the image from negative to positive.

Contrast control of the phosphor screen is preferably accomplished by a potentiometer knob 14 controlling the voltage applied to the infra-red projection lamps, and/or ultra-violet lamps. In this way screen brightness is regulated through a variable contrast control.

Film Drives

The film for the system is mounted on top and to the rear of the console. The film spools are readily accessible, and can be inserted in and out very easily. A lever is preferably provided to separate the pressure plates for film leading purposes.

For the placement of different sizes of film, adjustable guides may be used for each film size which detent readily into place. Conventional slewing speed as well as fine control are preferably provided in both directions.

SPECIFIC DESCRIPTION

More specifically referring to the figures, the invention comprises an enclosed case 1 having film handling reels 2 and 3 mounted on top thereof, the reels being connected to motors 4 and 5. A source of infra-red radiation is mounted in the enclosure 6 on top of the cabinet.

On the front surface 7 of the cabinet, which is preferably slanted, is mounted a translucent luminescent screen 8 which is coated on its inner side with a phosphor responsive to the transmitter infra-red radiation. X and Y axis coordinate scales are marked on the panel. Various controls are also mounted on the front of the cabinet. The knob 10 is connected to select different magnifications for instance 1×, 4×, and 9×. The viewer is adapted to scan the film so that small portions of the film may be selected to be magnified and projected. For this purpose the knob 11 is connected, as will be explained, to scan the film along the first or X axis and the knob 12 is connected to scan the film along a Y axis perpendicular to the X axis. A speed control 13 for the film drive is preferably provided, and a contrast control 14 is likewise provided.

Referring to FIG. 2 there is shown a side view of the device with the side cover removed in position for 1:1 magnification. A source of infra-red radiation which may be an infra-red lamp 9 is mounted in the enclosure 6 on top of the cabinet. Below the lamp 9 is mounted a Fresnel type lens 15 which is movable vertically on the lead screws 16 and 17 for the purpose of focusing the radiation on the plane of the film F. Lens 15 is operated by motor N which is stopped by limit switches 18 and 19. An infra-red filter 22 is preferably mounted above the film plates for the purpose of eliminating undesired radiation. The image projected by the radiation from the source 14 on the film F is projected downwardly as shown by the dotted lines onto a mirror M which is mounted near the bottom of the cabinet and mounted at an angle so that the radiation is reflected through a focusing lens L1 onto the rear of the luminescent screen 8.

Ultra-violet lamps 24 are mounted on the cabinet with reflectors 25 arranged to radiate onto the rear surface of the screen 8. The ultra violet sources may be fluorescent lamps having self contained filters for the transmission of 350 millimicron ultra-violet radiation.

Contrast control may be accomplished by a potentiometer, connected to knob 14, which controls the voltage to the infra-red lamp 9.

In order to obtain magnification of desired portions of the film, lenses L2, L3 of different magnifications are mounted on a carriage which is adapted to be scanned along X and Y axes over the optical path of the transmitted radiation so that small portions of the film may be magnified. The scanning is accomplished by the knobs 11 and 12 through flexible cables, as will be explained. The lenses L2 and L3 are also mounted for lining up along the optical axis with a third positioning carriage 46.

Also mounted on the carriage C is a focusing lens set L4 which is mounted on an inverted L-shaped arm 35. Lens L4 focuses on the lenses L2 and L3.

FIG. 3 shows the lenses in position for magnification by the lens L3 which may be of 9:1 magnification. The lens L3 is selected by the knob 10, as will be explained. In the position shown in FIG. 3, the lens set L4 is interposed between the radiation source 9 and the film F for the purpose of focusing the radiation on a desired small portion of the film F. Any desired portion of the film may be selected and magnified by scanning the carriage C, and therefore the lenses 3 and 4 along both the X and Y axes by means of the knobs 11 and 12. Note that in the position shown in FIG. 3, the lenses L1 and L5 are retracted out of the optical path.

Figure 4:
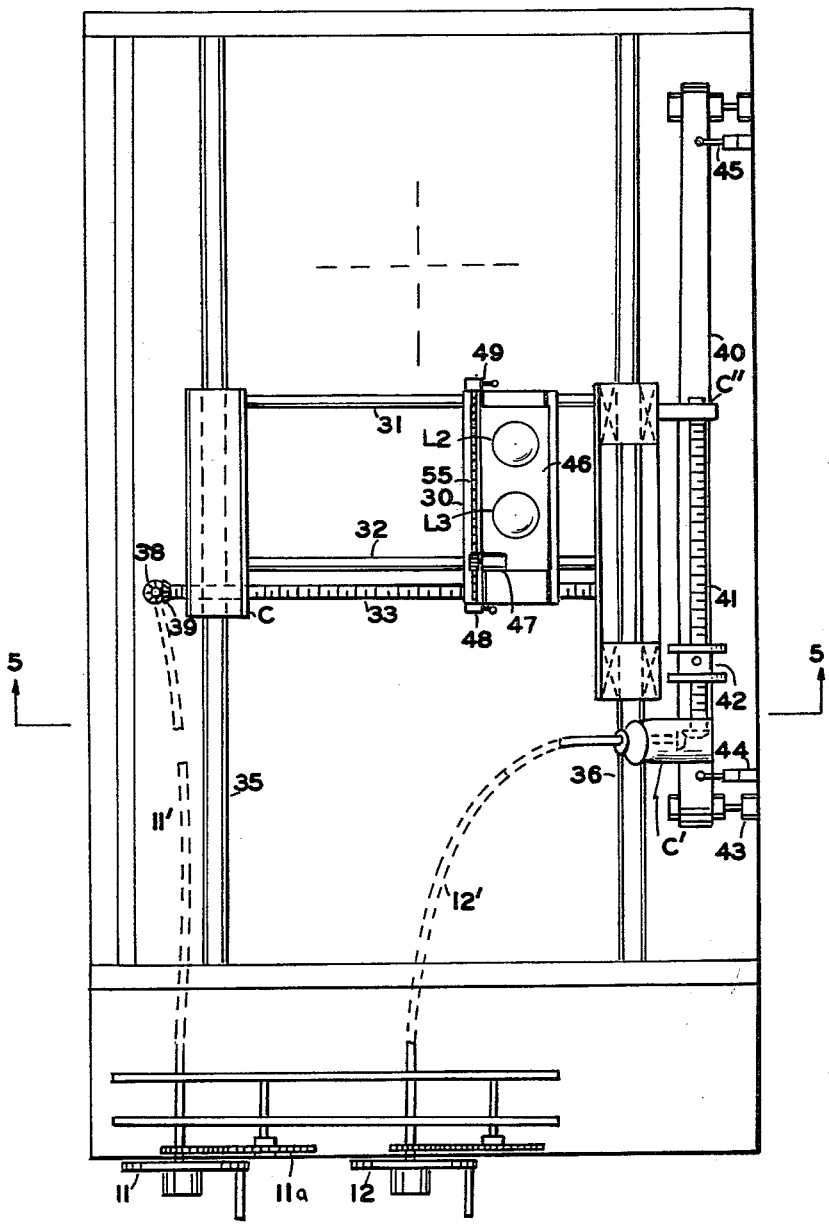
FIG. 4 is a plan detail view of an embodiment of the invention.

FIG. 4 is a plan detail view and FIG. 5 is a vertical sectional view of an embodiment of the invention. The 9× lens L3 and the 4× lens L2 are mounted on a carriage 46 which is slidably mounted on a carriage 30. Carriage 46 centers either lens by means of motor 47 and micro switches 48 and 49 on carriage 30 which are actuated by the ends of carriage 46. Motor 47 is geared to rack 55 on carriage 30. Carriage 30 is adapted to move along the X axis, that is, across the case, by means of its mounting on rails 31 and 32. The X axis motion is provided by means of a lead screw 33.

The rails 31, 32 and the lead screw 33 are mounted on a carriage C which is adapted to move along the Y axis, the carriage C being mounted on rails 35, 36 which are fixedly connected to the frame.

The X axis motion is provided by turning the lead screw 33 by means of the crank 11 which is mounted on the front panel. The crank 11 is connected to a flexible shaft 11′, the other end of which is connected to the lead screw 33 by means of bevelled gears 38, 39. Indicator 11a geared to crank 11 indicates the X coordinate.

The Y axis motion is provided by the crank 12 mounted on the front panel which is connected to the flexible shaft 12', the other end of which is geared to the lead screw 41 mounted on the carriage C. Indicator 12a geared to crank 12 indicates the Y axis coordinate. The lead screw 41 extends through a nut 42 which is fixedly mounted on a timing belt 40 which is motor driven, the motor 43 being stopped in the retracted 1× position by a first micro switch 44 which is actuated by surface C' of carriage C, and in the extended position for increased magnification by means of a second micro switch 45 which is actuated by surface C" of carriage C.

The lens L1, FIGS. 2 and 5, is mounted on a rail 50 which extends across the case 1 and a lead screw 51 which extends across the case parallel to the rail 50. The lead screw is operated by motor 52 so that when the apparatus is in the increased magnification position the lens L is driven to one side. Lens L1 is stopped in 1× position by micro switch 53 and in retracted 4× and 9× positions by micro switch 54. Alternatively the lead screw 51 may be manually operated with a crank and a flexible shaft connection, and the other motor controls may also be replaced by manually operated flexible cables.

Figure 6:
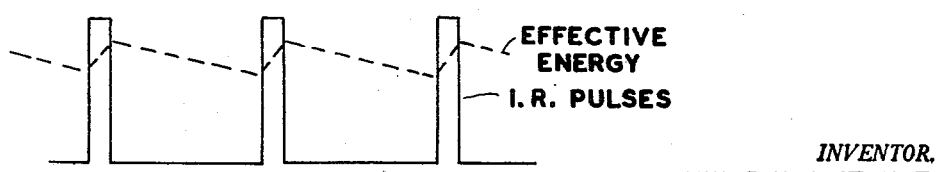
FIG. 6 is a graph illustrating the operation of the light pulsing means.

A novel infra-red pulsing technique may be incorporated in order to increase the brightness of the screen without overheating the film. The purpose of the pulsing of the infra-red energy is to allow the phosphor screen to store the impinging energy, so that even though the average energy is decreased, the phosphor screen retains the peak energy as shown in FIG. 6.

Through the utilization of a pulsing light source, a gain of brightness of as much as a factor of four is thus obtained.

The pulsing of the infra-red source may be done in one of the following methods:

(1) Utilizing a chopping disc P and a synchronous motor N, as shown in FIG. 2, in front of the infra-red light source 9.

(2) Utilizing a pulsed light source: There are several conventional pulsed light sources and power supplies that emit pulsed light that can be used for this application.

(3) A filament light source that is supplied by normal 60 c.p.s. power. The filament is designed for very fast cooling so that the light emitted by the filament follows the input 60 c.p.s. power, thus approximating a pulsed light source.

FIG. 7 shows a schematic circuit diagram of the motor controls which are operated by the magnification selector knob 10. The knob 10 is connected to a double pole switch 10a which is connected to operate the lens L1, a double pole switch 10b which is connected to operate the carriage C, a double pole switch 10c which is connected to operate the lens 15 and a double pole switch 10d which is connected to operate the carriage 46 which mounts the lenses L2 and L3. All of the switches are mechanically connected to the knob 10.

Switch 10a is connected to operate the lens L1 which is moved by means of the motor 52 rotating the lead screw 51. When the knob 10 is turned to the 1× position as shown, the motor 52 moves the lens L1 until it opens the normally closed micro switch 53. The circuit is completed from the plus battery 55 through the 1× position of switch 10a, through switch 53 and motor 52 back to ground. The circuit is interrupted when the case of the lens L1 opens the switch 53 which is placed to properly position the lens. When the switch is turned to the 4× or 9× position the negative battery 56 is connected through the other pole of the switch 10a, through micro switch 54 which is normally closed, and then through the motor 52 and back to ground. When the lens L1 is sufficiently retracted from the optical path the switch 54 is opened by lens L1 stopping the lens.

Switch 10b operates an identical circuit for positioning the carriage C. In the 1× position the motor 43 moves the carriage C until it opens the micro switch 44. This circuit is completed from the positive battery 55 through the switch 44, motor 43, back to ground. In the 4× and 9× positions the motor 43 moves the carriage in the other direction until the micro switch 45 is opened. This circuit is completed from battery 56 through the micro switch 45, motor 43, back to ground. The motors may be conventional, reversible D.C. motors. However, a conventional arrangement using alternating current motors may also be used for the same purpose.

Switch 10c operates the lens 15 in the same manner as previously described. When the switch is in the 1× position the motor N drives the lens 15 down until the micro switch 18 is opened. This circuit is completed from the battery 55 through switch 18, motor N, back to ground.

When switch 10c is turned to the 4× or 9× position the motor raises the lens 15 until the micro switch 19 is opened. This circuit is completed from the battery 56 through switch 10c, switch 19, motor N, back to ground.

Switch 10d operates the carriage 46 to the 4× and 9× positions. The 1× position is not used on this switch as the entire carriage C is retracted in the 1× position. In the 4× position the circuit is completed through battery 55, one pole of switch 10d, micro switch 48, to motor 47, and back to ground. In the 9× position the circuit is completed from battery 56 through the other pole of switch 10d, switch 49 through the motor 47, back to ground.

The operation of the switch 10D has the following function:

In the 1× position—
   (1) Centers L1
   (2) Retracts carriage C and lens L4
   (3) Sets lens 15
In the 4× position, switch 10—
   (1) Retracts L1
   (2) Sets L2
   (3) Sets carriage C The 9× position is the same as the 4× position, except L3 is placed in the optical path instead of L2.

In operation, when the knob 10 is set on the 1× position the entire frame may be viewed. If it is desired to magnify a particular portion the coordinates of the portion are noted, then the knobs 11 and 12 are cranked to the selected coordinates, the knob 10 is then turned to the 4× or 9× position.

The belt 40 is connected to the carriage C so that when the knobs 11 and 12 each are centered at the coordinate 5 then the magnification lens being used will be directly centered.

Many modifications may be made especially in the controls. For instance all positioning controls could be operated by flexible shafts connected to separate knobs or equivalent motor arrangements could be used.

I claim:

1. Means to obtain a positive view directly from a film negative, comprising an enclosed cabinet, a source of infra-red radiation mounted adjacent the top of said cabinet, film holding means having an aperture mounted below said source, means to protect film in said film holding means from overheating comprising a rotating chopping disc positioned between said radiation source and said film holding means, said disc being adapted to pass discrete pulses, of said radiation, a first lens adapted to focus said radiation on the entire aperture of said film holder, means to move said first lens vertically, a mirror mounted below said film holder in the optical path of said radiation and near the bottom of said cabinet, a translucent screen mounted on the front of said cabinet, a luminescent phosphor on the back side of said screen, said mirror being mounted at an angle to reflect said radiation onto said screen, and a second lens placed between said mirror and said screen adapted to focus said radiation on said screen, and an ultra-violet source adapted to activate said screen.

2. Apparatus as in claim 1 having means to provide a plurality of different magnifications of selected areas of said film comprising a carriage, a plurality of lenses of different magnifications mounted on said carriage, means to move said carriage to position a selected lens to focus a desired portion of said film image, an extending arm mounted on said carriage, lens means on said arm, said lens means being mounted on the same vertical axis as a selected one of said lens on said turret, means to move said carriage and said arm mounted lens into the optical path of said radiation so that said radiation is focused on a predetermined portion of said film and said predetermined portion is amplified by a predetermined magnification and transmitted to said mirror and said screen.

References Cited in the file of this patent

UNITED STATES PATENTS

| | | |
|---|---|---|
| 2,260,552 | Boni et al. | Oct. 28, 1941 |
| 2,937,569 | Wilton | May 24, 1960 |
| 2,996,617 | Heckscher | Aug. 15, 1961 |
| 3,028,492 | Goerz et al. | Apr. 3, 1962 |

FOREIGN PATENTS

| | | |
|---|---|---|
| 461,938 | Italy | Feb. 20, 1951 |